United States Patent

Stephens et al.

Patent Number: 5,844,521
Date of Patent: Dec. 1, 1998

[54] GEOLOCATION METHOD AND APPARATUS FOR SATELLITE BASED TELECOMMUNICATIONS SYSTEM

[75] Inventors: Scott A. Stephens, Manhattan Beach, Calif.; Carl F. Reisig, Irving, Tex.; Arthur L. Garrison, Redondo Beach, Calif.

[73] Assignee: TRW Inc., Redondo Beach, Calif.

[21] Appl. No.: 758,871

[22] Filed: Dec. 2, 1996

[51] Int. Cl.⁶ .............................. G01S 5/02; H04B 7/185
[52] U.S. Cl. .......................................................... 342/357
[58] Field of Search ........................ 340/825.03, 825.44, 340/991; 342/44, 50, 357, 463; 455/12.1, 13.1, 13.2, 31.2, 13.4, 38.3, 134, 343, 456, 524, 427

[56] References Cited

U.S. PATENT DOCUMENTS

| | | | |
|---|---|---|---|
| 5,414,432 | 5/1995 | Penny, Jr. et al. | 342/357 |
| 5,596,315 | 1/1997 | Olds et al. | 340/825.03 |
| 5,603,079 | 2/1997 | Olds et al. | 455/13.1 |
| 5,613,194 | 3/1997 | Olds et al. | 455/429 |
| 5,640,442 | 6/1997 | Fitzgerald et al. | 455/31.2 |
| 5,666,647 | 9/1997 | Maine | 340/991 |
| 5,710,805 | 1/1998 | Armbuster et al. | 379/59 |

Primary Examiner—William L. Oen
Attorney, Agent, or Firm—Michael S. Yatsko

[57] ABSTRACT

A method is provided for determining the geolocation of a mobile terminal within a telecommunications satellite system. The system supports first and second forward communications links from first and second earth stations through first and second satellites to a common mobile terminal. The method includes receiving, at the mobile terminal, first and second forward link communications signals from the first and second earth stations and, based thereon, obtaining synchronization differential data. The synchronization differential data may include timing and frequency synchronization data necessary to maintain synchronization between the first and second communications at the mobile terminal. The mobile terminal transmits the synchronization differential data to the first earth station over the return link. The first earth station receives communications signals from the mobile terminal and based thereon calculates return link synchronization data. The earth station further calculates at least first and second geoposition lines, along which the mobile terminal is positioned, based on the return link synchronization data and the synchronization differential data received from the mobile terminal. The first and second geoposition lines define a point of intersection at which the mobile terminal is located.

15 Claims, 6 Drawing Sheets

GEOLOCATION METHOD AND APPARATUS FOR SATELLITE BASED TELECOMMUNICATIONS SYSTEM

CROSS-REFERENCE TO RELATED APPLICATIONS

The present application relates to co-pending application "GEOLOCATION METHOD AND APPARATUS FOR SATELLITE BASED TELECOMMUNICATION SYSTEM", filed Apr. 24, 1996, Ser. No. 08/638,066, Attorney Docket No. 16-0281. The above co-identified application, 08/638,066, is assigned to the Assignee of the present application and expressly incorporated herein in its entirety by reference.

STATEMENT REGARDING FEDERALLY SPONSORED RESEARCH OR DEVELOPMENT

Not applicable

BACKGROUND OF THE INVENTION

The present invention generally relates to a satellite based telecommunications system. More specifically, the invention relates to a method and apparatus for calculating the geolocation of user terminals based on information within the communications signal.

Today satellite systems exist for supporting telecommunications with, and/or providing geolocation information to, user units. Satellite based telecommunications systems, such as Odyssey (as proposed by the assignee of the present application), utilize a constellation of satellites to relay communications signals between user terminals and earth or base stations. The user terminals are assigned to earth stations. The earth stations direct calls to and from the assigned user terminals. The user terminals and associated earth stations communicate along preassigned communications channels having a preassigned bandwidth (subband) centered about a carrier frequency. Some communications systems may require that the location of a mobile terminal communicating through the satellite constellation be determined or verified for a number of reasons, such as to efficiently allocate network resources, to block or accept services based on mobile terminal location, to route calls to special bureaus for emergency or operator services, to effect billing dependent upon location, to direct emergency services, to provide secondary navigational services and the like. Heretofore, the location of mobile terminals may be determined by a satellite based navigation system.

Satellite based navigation systems, such as the global positioning satellite (GPS) system, include a constellation of satellites which transmit navigation signals to the user units. Each satellite emits a unique navigation signal along a preassigned navigation channel. User units obtain navigation information from multiple navigation signals and, based thereon, calculate the terminal's position relative to the earth. One GPS technique is explained in an article entitled "*GPS Signal Structure and Performance Characteristics.*" by J. J. Spilker, Jr., Global Positioning System, which is incorporated by reference in its entirety. However, in GPS systems, a navigation terminal requires the use of navigation measurements from at least three satellites and only affords one way communications. The GPS navigation terminals do not transmit signals to the satellites.

Alternatively, ranging systems have been suggested for tracking moving satellites from earth stations. One example is the TDRS system which performs ranging of moving satellites from a geostationary satellite. The TDRS system relies on a single two-way ranging link between a geosynchronous satellite and a low orbiting satellite to track movement of the low orbiting satellite. Alternative ranging systems use a single two-way ranging link between an earth station and a satellite to track movement of the satellite. However, these ranging systems require ranging measurements to be made over a long period of time in order to ensure high accuracy and resolve position ambiguity of the moving satellite. Additionally, these ranging systems use only a single tracking station or track a single satellite at any given time. Further, these ranging systems have not been applied to position determination of mobile terrestrial user terminals.

Further, the navigation, ranging and communications signals are transmitted over separate, mutually exclusive channels specifically designated to carry corresponding signals. Consequently earth stations, satellites and user terminals must be designed to support separate communications and navigation channels, thereby undesirably complicating the overall system. Existing telecommunications systems have not been able to merge communications and geolocation signals/data onto a single RF signal. Instead, conventional systems rely on radio signals and associated transmitters and receivers which are specifically designed and applied for position determination.

As the popularity of cellular telecommunications increases, more and more demands are being placed upon the capacity of telecommunications satellite systems. These demands effectively monopolize the available communications subbands. Satellite systems have attempted to increase the overall capacity of the available frequency subbands by utilizing a variety of user-access or "spread spectrum-based" techniques to increase the user-density within a given frequency subband. These user-access techniques include frequency division multiple access (FDMA coding), time division multiple access (TDMA coding), and code division multiple access (CDMA coding). In addition, hybrid techniques have been proposed using a combination of TDMA, FDMA and CDMA codes. Depending upon the coding technique, each user terminal when assigned to a corresponding channel, is given a unique TDMA/FDMA/CDMA code and/or transmission timing/frequency. The user terminals transmit and receive all communications signals at the assigned carrier channel, code and transmission timing/frequency.

As the coding techniques increase the user density, acceptable tolerances decrease between adjacent user channels before co-channel interference results. Therefore, the above-mentioned coding techniques require the communications link between a user terminal and an earth station to be adjusted or tuned continually. Such adjustments are necessary to ensure that the user terminal continues to transmit within its assigned channel as the user terminal and/or coverage satellites move relative to one another.

User terminals and earth stations transmit telecommunications signals as discrete packets or frames of information. Several of the above-mentioned coding techniques require that the communications link be maintained "synchronous" between the earth station and the user terminal. A "synchronous" communications link requires that each frame of data be received (at a user terminal or an earth station) at an instant in time simultaneous with receipt of frames transmitted from other terminals and/or earth stations. The frames must also be received in the assigned subband centered about an assigned carrier frequency. Thus, synchronization and subband alignment are determined with respect to the receiver.

However, synchronization and subband alignment are continuously effected 1) by variations in range between the satellites and user terminals or earth stations (e.g., propagation delay) and 2) by changes in the relative range velocity between the satellite and the user terminals or earth stations (e.g., Doppler effect). Propagation delay variation arises as user units and/or coverage satellites move since the distance or range changes between a user terminal and its associated earth station. Consequently, the propagation time of a frame between an earth station and user terminal changes. To compensate for variations in the propagation time, the transmitter (e.g., earth station or user terminal) retards or advances the initiating time at which data frames are transmitted. Thus, transmitters located near an intended receiver retard the transmission initiating time, while transmitters located far from the receiver advance the transmission initiating time.

Doppler shift variation arises as satellites move relative to earth stations and user terminals since the resultant carrier frequency perceived at a receiver changes. For instance, when a satellite moves toward a user unit, the perceived carrier frequency at the satellite (and at the subsequent earth station) of a communications signal is greater than the actual carrier frequency at which the user terminal transmitted the communications signal. Stated another way, the perceived carrier frequency at the receiver is greater than it would otherwise be if the satellite and transmitter remained at rest with respect to one another. Similarly, when the satellite moves away from the transmitter, the receiver perceives a carrier frequency which is lower than the carrier frequency which would be otherwise perceived if the satellite were not moving relative to the transmitter. This pnenomina is referred to as the "Doppler effect." Transmitters (e.g., user terminals and earth stations) adjust the carrier frequency, at which communications signals are transmitted, to account for positive and negative Doppler shifts. By adjusting the frequency and timing, a transmitter ensures that communications signals transmitted therefrom remain within the assigned channel and arrive synchronous with signals from other transmitters.

The timing and frequency may be controlled in several manners. For instance, the earth station may transmit timing and frequency update information to each user terminal.

However, conventional telecommunication systems limit the use of the telecommunications channels to transmission of telecommunications information. Consequently, in conventional telecommunications systems separate channels must be used to provide other functions such as navigation and the like.

Further, existing systems are unduly slow in determining terminal location. It is preferred that location determination be conducted quickly since telephone calls are typically of short duration and since location determination may be required during call setup, such as for network routing purposes and the like. Minimizing the location determination time also reduces the negative effects of terminal motion across the service of the earth upon the ability to locate the terminal.

Moreover, systems which provide GPS-type navigation information require an unduly large number of satellites. To calculate geolocation, GPS user terminals require simultaneous line-of-sight navigation links with multiple satellites. Consequently, the GPS system necessitates a constellation of satellites which ensure that multiple satellites are simultaneously viewable at each position covered by the system. This multi-satellite coverage technique unduly increases the number of satellites.

A need remains within the industry for an improved geolocation method and apparatus for use with satellite based telecommunications. It is an object of the present invention to meet this need.

BRIEF SUMMARY OF THE INVENTION

It is an object of the present invention to provide geolocation information and telecommunications data over a single channel.

It is an object of the present invention to provide a satellite based telecommunications system which calculates the geographic position of a user terminal based on related information passed along a bi-directional communications link between the user terminal and an earth station, via at least one satellite.

It is a further object of the present invention to provide a satellite based telecommunications system which determines user terminal location through the use of only two satellites visible to the user terminal.

It is a corollary object of the present invention to utilize common signal parameters to maintain synchronization of the communications return link and to calculate a range solution line to the user terminal.

It is a further corollary object of the present invention to utilize the frequency offset parameter to retain proper channel alignment and to calculate the doppler solution line to the user terminal.

It is a further object of the present invention to combine the range and doppler solutions obtained during synchronization and channel alignment to calculate geoposition.

It is yet another object of the present invention to afford network control, such as call routing, based on geolocation information obtained from RF communications signals.

It is a further object of the present invention to afford emergency location services based on geolocation information obtained from RF communications signals.

It is another object of the present invention to provide navigational and communications services to the user terminals over a single channel.

It is yet another object of the present invention to use a communications channel for the dual purpose of calculating billing and call management information between location areas and companies which require different types of services based on their location.

These and other objects are achieved by a method for determining the geolocation of a user terminal within a telecommunications system having a constellation of satellites which relay communications signals between earth stations and user terminals over preassigned channels. The method achieves synchronization of the telecommunications signals by calculating timing and frequency update information for the user terminals. The timing and frequency update information is also used by the earth station to calculate the geoposition of the user terminal. To do so, the earth station calculates a distance between the satellite and a user terminal based on the corresponding propagation time therebetween which is obtained from the timing information. Once the satellite to user terminal distance is obtained, a range solution line may be calculated therefrom. In addition, the frequency update information is used to calculate a Doppler solution line upon which the user terminal is positioned. Thereafter, the range and Doppler solution lines are combined to obtain points of intersection therebetween. These points of intersection represent potential geolocations of the user terminal. The earth station discriminates between these intersection points in one of several manners, such as the coverage beam spot or geographic cell assigned to the user terminal. Upon obtaining a single intersection point, the longitude and latitude of this point or output is the geolocation of the user terminal.

An alternative method is provided for determining the geolocation of a mobile terminal within a telecommunications satellite system having a constellation of satellites which relay communications signals between earth stations and mobile terminals via intermediate satellites. The satellite system supports first and second forward communications links from first and second earth stations through first and second satellites to a common mobile terminal. The system further supports at least one terminal communications link from the mobile terminal through the first satellite to the first earth station. The method includes transmitting first and second communications signals over the first and second forward links to the mobile terminal from the first and second earth stations. The mobile terminal obtains synchronization differential data based on the received first and second communications signals. The synchronization differential data may include timing and frequency synchronization data necessary to maintain the first and second communications signals synchronized in time and frequency at the mobile terminal. The mobile terminal transmits the synchronization differential data to the first earth station over the return link. The first earth station receives communications signals from the mobile terminal and based thereon calculates return link synchronization data. The earth station further calculates at least first and second geoposition lines, along which the mobile terminal is positioned, based on the return link synchronization data and the synchronization differential data received from the mobile terminal.

The first and second geoposition lines define a point of intersection at which the mobile terminal is located.

DETAILED DESCRIPTION OF THE INVENTION

Figure 1:
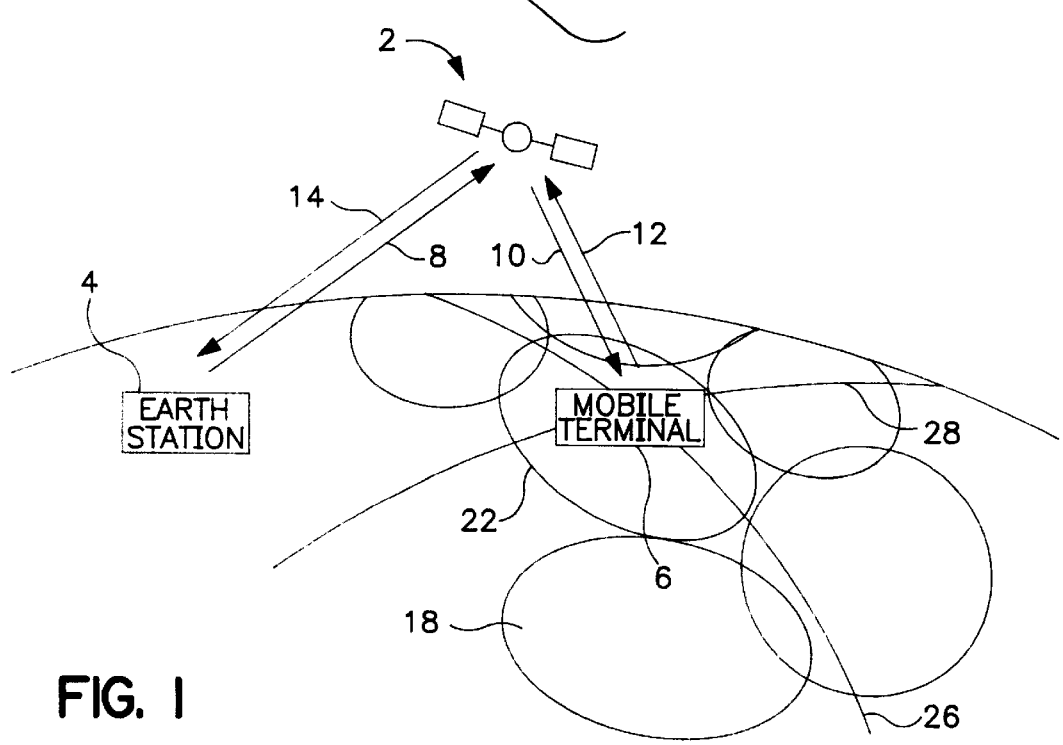
FIG. 1 generally illustrates a perspective view of a satellite system according to the present invention.

FIG. 1 generally illustrates a satellite based telecommunications system including a satellite 2 which relays communications signals between an earth station 4 and a user terminal 6. The earth station 4 transmits signals to the user terminal 6 through a forward link including link sections 8 and 10. The user terminal 6 transmits communications signals to the earth station 4 via a return link including link sections 12 and 14. The satellite 2 functions as a "bent pipe" and passes communications received upon forward link section 8 onward to the user terminal 6 via link section 10. Similarly, the satellite 2 relays without delay signals received upon link section 12 to the earth station 4 upon return link section 14. The preferred embodiment may utilize a closed loop system in which the earth station 2 transmits corrective timing and frequency error information to each corresponding user terminal to maintain a synchronous communications link therebetween. While FIG. 1 illustrates a single user terminal 6, it is understood that the preferred embodiment is useful with multiple terminals, earth stations and satellites.

Figure 2:
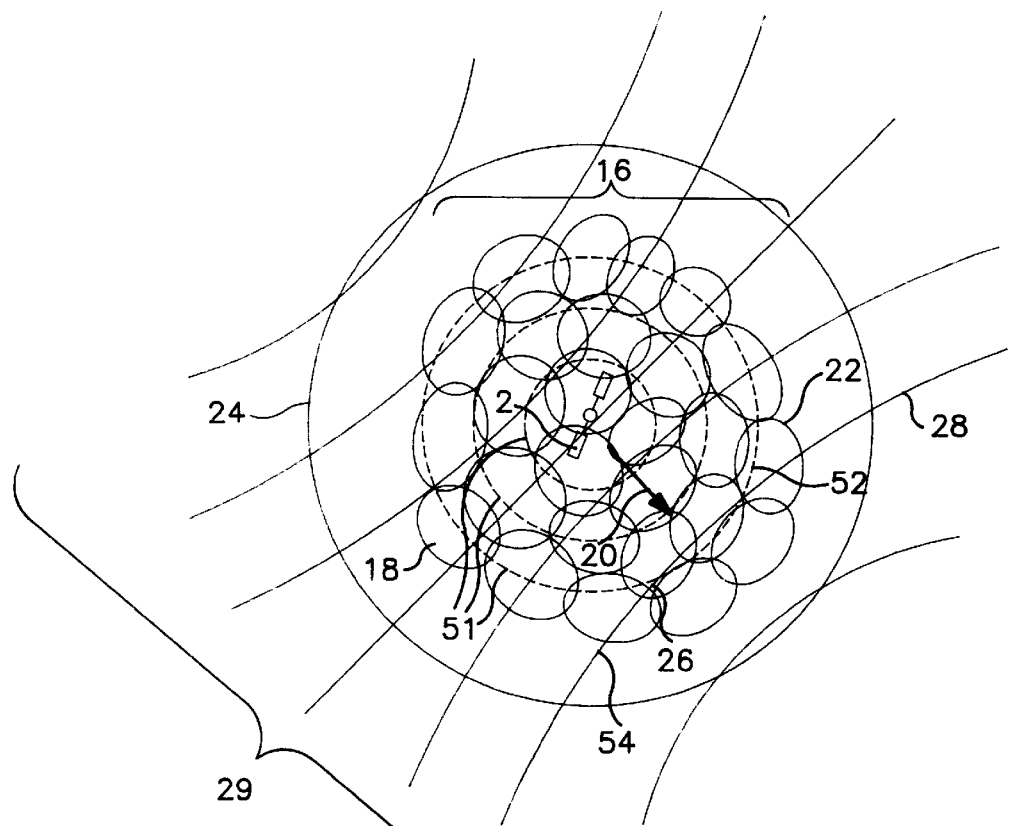
FIG. 2 generally illustrates a top plan view of a satellite and its associated coverage footprint.

FIG. 2 illustrates a footprint 16 representing the coverage area of satellite 2. The satellite 2 forms the footprint 16 from a plurality of overlapping beam coverage spots 18. The footprint 16 moves across the surface of the earth 24 as the satellite 2 travels in the direction indicated by arrow 20. The satellite 2 may support communicates between the earth station 4 and user terminal 6 as long as they are located in the footprint 16.

The satellite based telecommunications system of the preferred embodiment may utilize several management techniques such as spread spectrum communications. By way of example only, the system may use code division multiple access (CDMA) coding. Other coding techniques may be used so long as they enable multiple user stations 6 to transmit continuously and upon mutually exclusive channels. Such channels may be in the same frequency band, such as one of the frequency subbands assigned to beam spot 22. As more user terminals transmit within the same frequency subband, the potential for interference increases. Interference is avoided at the earth station by identifying a unique "signature" for each user terminal and its associated communications signal. Each user terminal is assigned a unique signature (e.g., a unique CDMA code, TDMA code, FDMA code) for transmission within the corresponding frequency subband. By way of example only, when CDMA coding is used, each signature represents a unique preassigned waveform or chip sequence, wherein a chip may represent a portion of a binary bit depending upon the number of user terminals assigned to the subband. The user terminal combines its signature waveform with outgoing frames or packets of communications and/or command data. The resultant combined RF signal is transmitted at the preassigned carrier frequency. When CDMA coding is used, the combination of the assigned carrier frequency and the terminal's unique CDMA code define a "channel" assigned to the particular user terminal.

Optionally, a variety of PN or CDMA codes may be used. Other codes may be used so long as the code retains a highly orthogonal characteristic. In other words, it is desirable that the code be easily distinguishable 1) from a replica of itself shifted in time and 2) from other codes used within the same subband of the telecommunications system.

Further explanation of multiple access coding techniques, such as TDMA, FDMA and CDMA may be found in the book entitled "*Satellite Communications Systems,*" second edition, by G. Maral and M. Bousquet, published by John Wiley and Sons, Ltd., West Sussex, England, 1993, Chapters 4 and 5. Chapters 4 and 5 of the above-referenced book to Maral, et al. are incorporated herein by reference in their entirety. CDMA coding is also explained in detail in a book entitled "Introduction to Communications Engineering," second edition, by Robert M. Gagliardi, published by Wiley-Interscience Publications, N.Y., N.Y., at pages 538–553. The pages 538–553 of the book by Gagliardi are also incorporated by reference.

Figure 3:
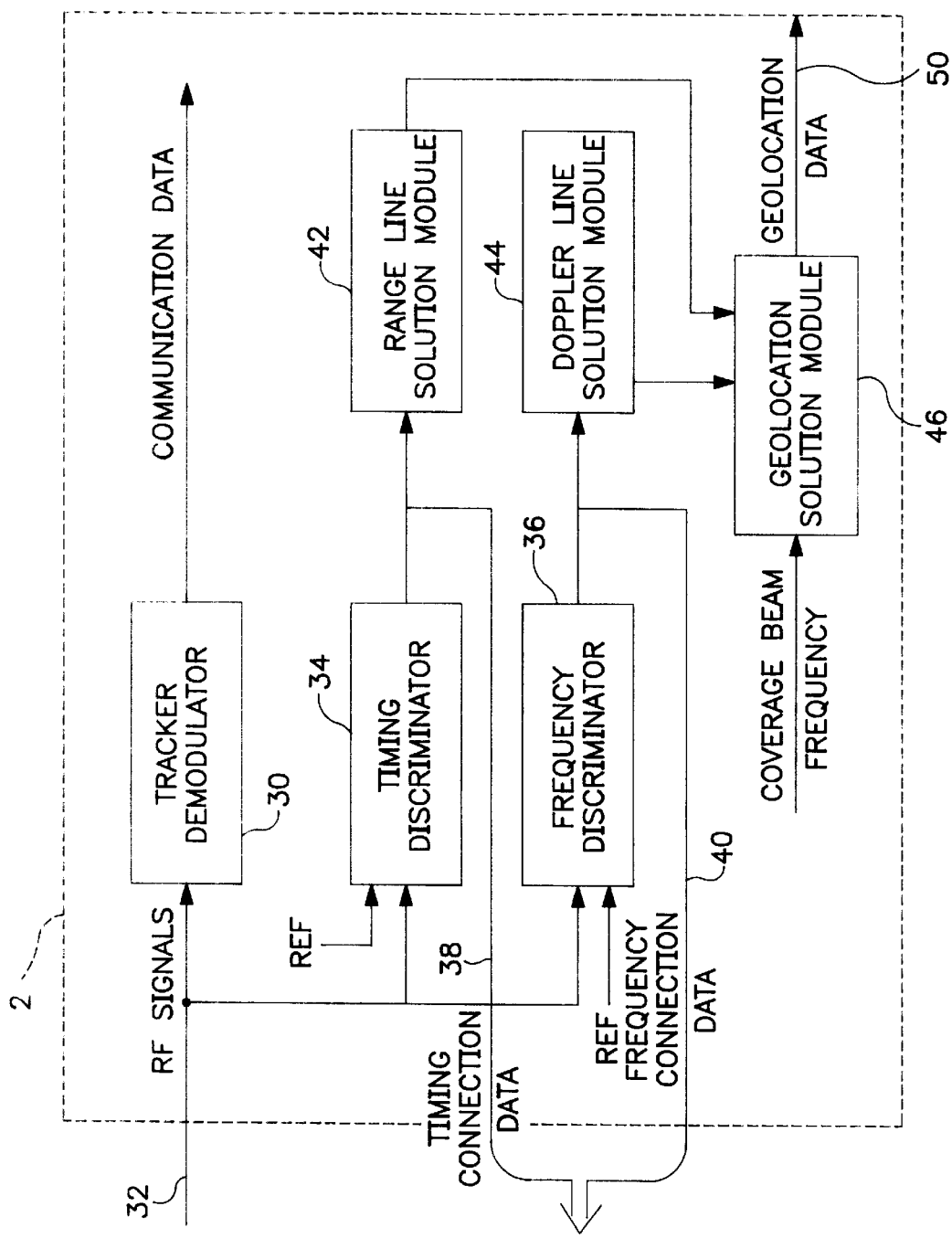
FIG. 3 generally illustrates a block diagram of an earth station according to the preferred embodiment of the present invention.

FIG. 3 illustrates, in block diagram form, a configuration for the earth station 2 utilized when calculating geolocation information. The earth station 2 includes a tracker demodulator 30 which receives an RF signal on line 32. The tracker demodulator 30 processes the received RF signal based on stored reference signatures for user terminals assigned to the earth station. The tracker demodulator 30 outputs communications data. When CDMA coding is used, the demodulator 30 may receive multiple incoming RF signals superimposed upon one another and substantially synchronized in time with respect to a reference time. Such synchronization ensures that the signature for each user terminal's RF signal is aligned in time with one another. In addition, all incoming RF signals must be centered about the corresponding carrier frequency to minimize co-channel interference.

While it is understood that the earth station processes multiple RF signals from multiple user terminals, for purpose of simplification, a single RF signal from a single user terminal is explained below in connection with the geolocation process.

The earth station 2 includes timing and frequency discriminators 34 and 36 which receive an RF signal. The timing discriminator 34 compares the incoming RF signal with a timing reference signal. The frequency discriminator 36 compares the incoming RF signal with a frequency reference signal. Based on these comparisons, the timing and frequency discriminators 34 and 36 output timing and frequency error correction data, respectively, along lines 38 and 40. The timing and frequency correction data are transmitted to the associated user terminal. The timing correction data may instruct the user terminal to advance or retard the initiating time of each frame of communications data in order to synchronize the starting point of such frames with incoming frames of data from other user terminals in the same subband and/or beam coverage spot.

As to frequency correction, the discriminator 36 directs, via the frequency correction data, the user terminal to increase or decrease the transmission carrier frequency in order to ensure that the perceived carrier frequency at the earth station corresponds to the user terminal's assigned carrier frequency. The perceived frequency at the earth station does not necessarily equal the transmitted frequency at the user terminal. Instead, as noted above, relative motion between the user terminal and satellite induce "Doppler" shifts into the carrier frequency. The amount of Doppler shift is dependent upon the distance between the user terminal and satellite. Also, the direction of the Doppler shift, namely positive or negative, is dependent upon the direction of travel of the satellite relative to the user terminal.

By way of example, as a satellite moves toward a user terminal, the perceived carrier frequency at the earth station receiver is greater than the emitted carrier frequency at the user terminal transmitter. Divergently, as the satellite moves away from the user terminal, the perceived carrier frequency at the earth station receiver is lower than the carrier frequency emitted at the transmitter. The frequency correction data transmitted to the user terminal enables the user terminal to adjust its transmitter carrier frequency to ensure that the received carrier frequency corresponds to the assigned carrier frequency for the channel to which the user terminal has been assigned to maintain its communications link with the earth station.

FIG. 2 illustrates a plurality of Doppler solution lines (generally denoted by bracket 29). Each Doppler solution line is associated with a specific Doppler shift value Consequently, a user terminal located anywhere along a single one of Doppler solution lines 29 will experience the same Doppler shift. Thus, an earth station receiver will perceive the same shift in carrier frequency from a user terminal located anywhere along a single Doppler solution line.

FIG. 2 also illustrates a plurality of range solution lines (generally denoted by dashed lines 51). Each range solution line is associated with a constant distance between the satellite and user terminal. Each range solution line corresponds to a unique round trip propagation time delay between the earth station, satellite and user terminal. The round trip propagation time equals the time required for an RF signal to travel along forward link sections 8 and 10 to the user terminal and back along the return link sections 12 and 14 to the earth station.

Returning to FIG. 3, the timing and frequency correction data are also supplied to range and doppler line solution modules 42 and 44. The range and doppler line solution modules 42 and 44 calculate the range line 26 and doppler solution line 28 (FIG. 1).

The range solution module 42 calculates a range solution line 26 based on the earth station to user terminal range which is calculated based on the round trip propagation time required for a communications signal to travel along the forward links 8 and 10 (FIG. 1) and return along the return links 12 and 14. Once the round trip propagation time is calculated by the discriminator 34, the range between the satellite and user terminal may be calculated since the range between the satellite and earth station is already known. Once the range between the satellite and user terminal is calculated, a range solution line 26 may be drawn (as shown in FIG. 1) with the satellite 2 at its center and with a radius equalling the distance between the satellite and user terminal. The Doppler solution line module 44 may calculate the Doppler shift line 28 based on the frequency shift between the transmitted carrier frequency at the user terminal and the received carrier frequency at the earth station. Optionally, the transmitted carrier frequency may be calculated from stored past Doppler shift information concerning the user terminal which is updated repeatedly with the frequency error data determined in discriminator 34. Once the frequency shift is calculated, a corresponding Doppler solution line may be obtained, such as from a look-up table or through empirical techniques.

Once the range solution line and Doppler solution line are calculated in modules 42 and 44, these line solutions are passed to the geolocation module 46. The module 46 thereafter calculates the intersections of these lines as longitudes and latitudes. For instance, the solution line may represent an equation defining a circle, centered at the satellite, on which the user terminal must fall. Similarly, the Doppler solution line may represent an equation defining an arc centered on the axis of the satellites direction of movement. The lines include two points of intersection at points 52 and 54. The correct point of intersection may be determined based upon the carrier frequency of the beam spot covering the user terminal. As explained above, each beam spot utilizes one or more unique subband carrier frequencies. Consequently, the beam spot surrounding point 52 utilizes a carrier frequency which differs from the beam spots surrounding point 54. Based thereon, point 54 may be discarded and point 52 identified as the geolocation of the user terminal.

Figure 4:
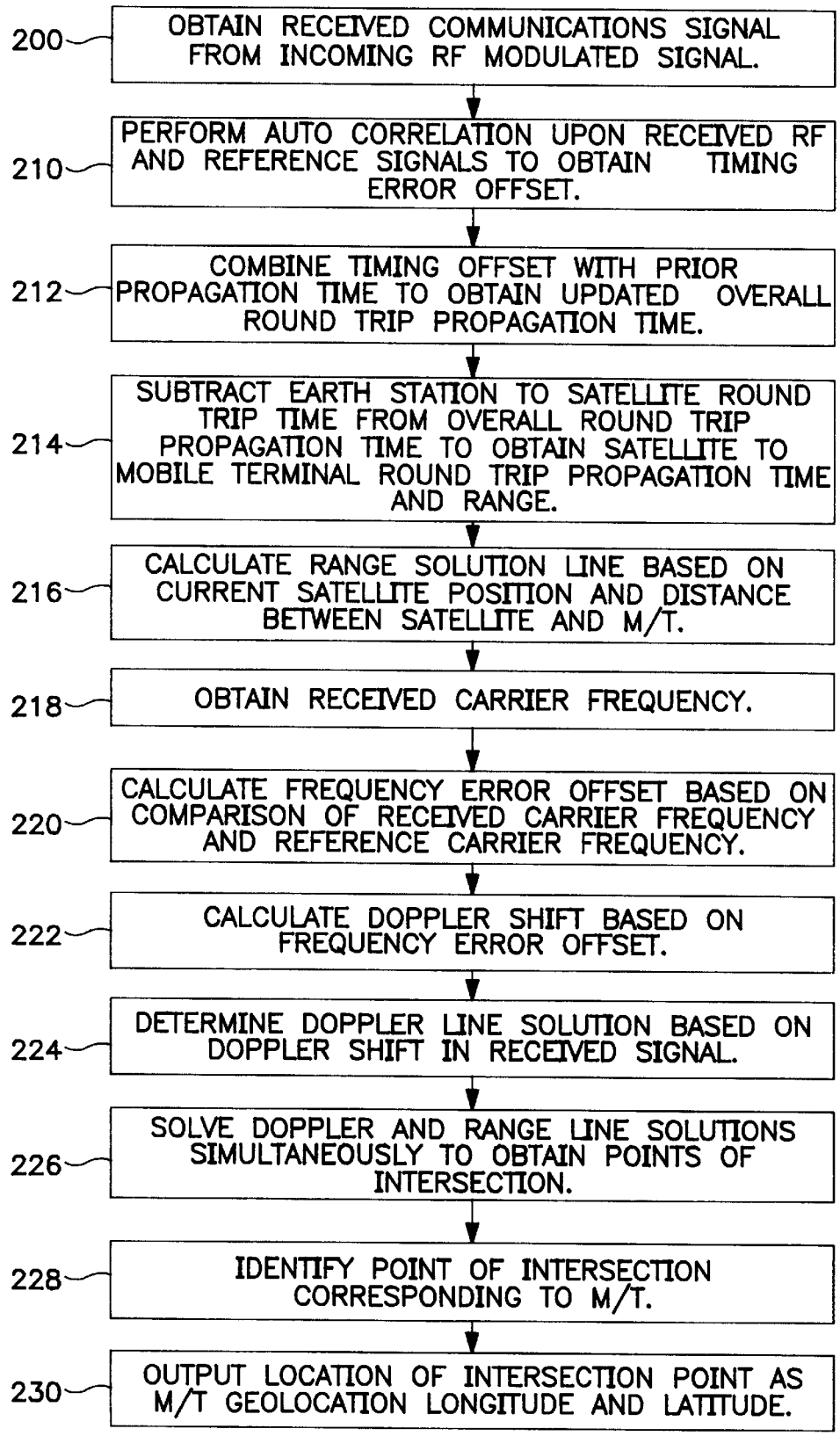
FIG. 4 generally illustrates a flow chart of the processing sequence followed by an earth station according to a preferred embodiment of the present invention.

FIG. 4 illustrates the processing sequence carried out by the preferred embodiment of the present invention to calculate the user terminal's geolocation. Once a communications signal is received (step 200), auto correlation is performed (step 210). The received RF signal may include a synchronization field which contains a synchronization signal that is correlated with a reference sync signal (e.g., reference signature code) to calculate the timing shift within the received RF signal from its desired start time. A timing error offset is obtained from this correlation process (step 210). At step 212, the timing offset is combined with the prior known propagation time between the earth station and user terminal to obtain an updated overall round trip propagation time. Next, at step 214, the propagation time between the earth station and satellite is subtracted from the updated overall round trip propagation time in order to obtain the propagation time between the satellite and user terminal. Once the satellite to user terminal round trip time is obtained, the distance or range therebetween may similarly be obtained. At step 216, a range solution line (such as line 26 in FIGS. 1 and 2) is calculated based on the satellite's current position and the distance between the satellite and user terminal. As noted above, the current satellite position and the satellite to user terminal distance serve as a center and radius, respectively, of a range solution line.

At step 218 the carrier frequency of the received communications signal is obtained. At step 220, a frequency error offset is calculated based on a comparison of the received carrier frequency and a reference carrier frequency. As explained above, the received and reference carrier frequencies will vary as the distance and relative velocity between the satellite and user terminal change. Turning to step 222, a Doppler shift is next obtained based on the frequency offset calculated in step 220. Thereafter, a Doppler solution line (such as line 28 in FIGS. 1 and 2) is obtained based on the Doppler shift in the received signal. When calculating the Doppler solution line, the earth station also considers the satellite's current position, direction of movement (as indicated by arrow 20 in FIG. 2) and velocity relative to the user terminal.

At step 226, the Doppler and range solution lines are simultaneously solved to obtain points of intersection (such as points 52 and 54 in FIG. 2). The points of intersection represent potential geolocations of the user terminal. At step 228, the earth station identifies the point of intersection (between points 52 and 54) corresponding to the user terminal. This identification may be carried out in a variety of manners. For instance, when points 52 and 54 lie within different coverage beam spots, the earth station may distinguish therebetween by determining which point of intersection lies within the coverage beam spot covering the user terminal.

Alternatively, the earth station may identify the point of intersection corresponding to the user terminal based on the user terminal's current assigned geographic cell. Geographic cells represent fixed predefined regions upon the earth which differ from coverage beam spots. Optionally, each user terminal may be assigned to a particular geographic cell. In such case, the earth station would distinguish between intersection points 52 and 54 based upon the geographic cell assigned to the user terminal. As a further option, discrimination between points 52 and 54 may be effected by a process of elimination. Once the desired point of intersection is identified, it is output as the user terminal's geolocation at step 230. This geolocation output may include a longitude and latitude identifying the user terminal's location.

The above identified geolocation information may be used for a variety of purposes. For instance, the geolocation may provide network control information necessary for call routing. The geolocation information may also be used to provide emergency location services, such as during 911 calls, to identify the position of the user terminal. Further, the geolocation information may be used to provide navigation services, billing and call management and the like, such as between countries and companies providing and requiring different services as a function of the user terminal's location, including service restrictions.

Optionally, the code timing discriminator 34 may be modified to utilize a variety of conventional synchronization routines for analyzing the incoming signal. The discriminator 34 may utilize auto correlation through any of several known techniques, such as the Tau-Dither method, Early-Late method, the Dot Product method and the like.

Figure 5:
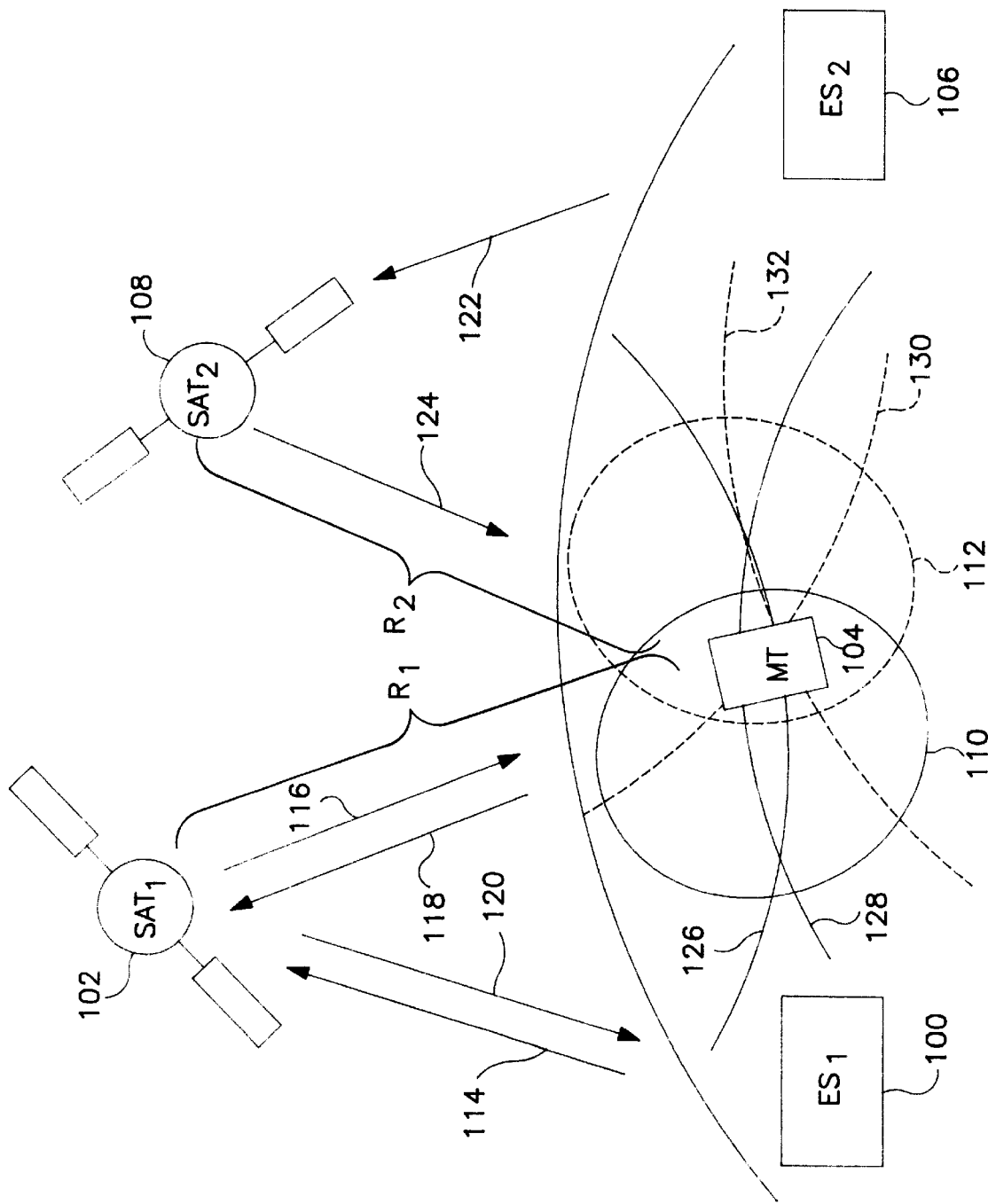
FIG. 5 generally illustrates a perspective view of an alternative satellite system according to the present invention.

FIG. 5 illustrates an alternative embodiment in which two earth stations and two satellites may be used in cooperation to calculate the geolocation of a single user terminal. By utilizing two satellites to calculate geolocation, the alternative embodiment of FIG. 5 affords greater accuracy in certain situations over the accuracy afforded by the first embodiment illustrated in FIGS. 1–4 which utilizes a single satellite for geolocation. One exemplary situation in which the alternative embodiment affords greater geolocation accuracy arises due to the fact that the field of view or footprint of a telecommunications satellite may cover a large portion of the earth. As explained above, the footprint is formed from a plurality of smaller overlapping beam coverage spots. However, each beam coverage spot may be several hundred kilometers in diameter. Thus, while knowledge of the satellite beam serving a terminal may provide a means for determining the geographical area in which a terminal is located, the beam area may be quite large and include both possible locations determined according to the method of FIG. 4.

The system of the alternative embodiment illustrated in FIG. 5 relies upon several characteristics of the satellite system. First, the system of the alternative embodiment presumes at least two satellites in the system constellation are transmitting signals within the region in which the user terminal is operating. Next, the system of the alternative embodiment presumes that either (1) each satellite in the constellation is synchronized in time and frequency to a "system clock" or, optionally, (2) the time and frequency of each satellite is known with respect to a system clock. Based on this knowledge of the time and frequency of each satellite, offsets may be determined between each satellite's time and frequency and the system clock's time and frequency. In addition, the system of the alternative embodiment presumes that each user terminal transmits "in-band signaling" along a return link through at least one satellite to at least one earth station. The return link in-band signaling data is generated in the user terminal and is coherently derived from communications signals received by the user terminal from two earth stations, as relayed through two satellites, along two forward links.

FIG. 5 illustrates first and second satellites 102 and 108 which relay communications signals between a user terminal 104 and first and second earth stations 100 and 106. As discussed in connection with the preferred embodiment, the first earth station 100 maintains a bidirectional communications link via forward uplink 114 and downlink 116 and via return uplink 118 and downlink 120. Satellite 102 relays communications signals between earth station 100 and user terminal 104 so long as both are within the footprint formed by satellite 102. While the complete footprint of satellite 102 is not illustrated in FIG. 5, a single beam coverage spot 110 from the footprint of satellite 102 is illustrated.

The second satellite 108 similarly forms a footprint (not shown in its entirety) having a beam coverage spot 112 therein covering the user terminal 104. The second satellite 108 supports at least a forward communications link between the second earth station 106 and user terminal 104. This forward communications link includes forward uplink 122 and downlink 124. The user terminal 104 may include at least two receivers for receiving incoming communications signals along forward downlinks 116 and 124. The user terminal 104 may include a single transmitter for transmitting communications signals along a single return link (uplink 118 and downlink 120). Optionally, the user terminal 104 may include multiple transmitters, such as to enable the user terminal 104 to transmit communications signals to the second earth station 106 via the second satellite 108.

The first satellite 102 is located a range $R_1$ from the user terminal 104 and is traveling at a velocity, relative to the user terminal 104, referred to as the "first range rate $R_1'$." The second satellite 108 is located a range $R_2$ from the user terminal 104 and travels at a velocity, relative to the user terminal 104, referred to as the "second range rate $R_2'$."

Figure 6:
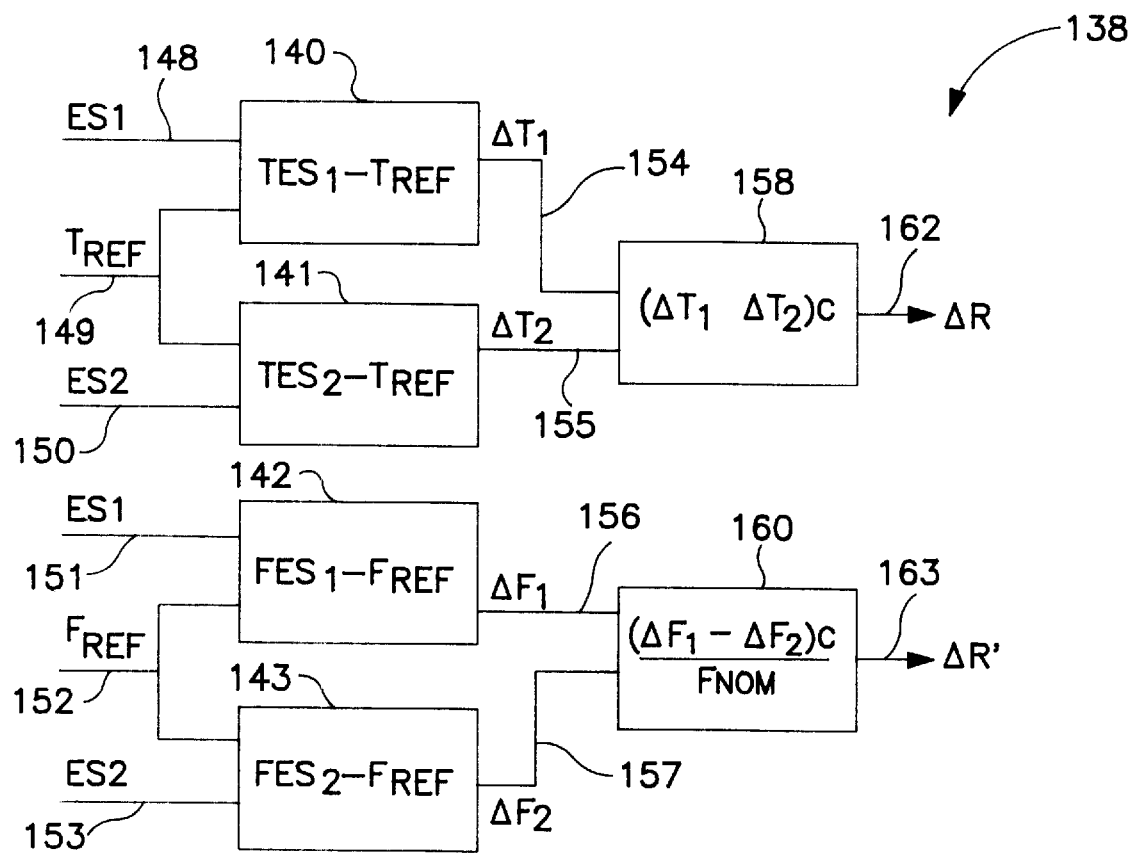
FIG. 6 generally illustrates a block diagram of a subsection of the mobile terminal which calculates synchronization differential data according to an alternative embodiment of the present invention.

FIG. 6 illustrates a subsection 138 of a user terminal used to calculate timing and frequency differentials between incoming signals from first and second earth stations 100 and 106. The differential calculation subsection 138 includes discriminators 140–143, a differential range module 158 and a differential range rate (Doppler) module 160. The discriminators 140–143 receive incoming signals along lines 148–153. The first timing discriminator 140 receives on line 148 the communications signal detected by a first receiver (not shown) from satellite 102 and earth station 100. The incoming communications signal received on line 148 is denoted by a timing signal symbol ES1. Similarly, a second timing discriminator 141 receives on line 149 a communications signal detected by a second receiver (not shown) from satellite 108 and earth station 106. The incoming communications signal received on line 150 is denoted by timing symbol ES2. The first and second timing discriminators 140 and 141 receive a common timing reference signal generated by a timing reference clock (not shown) on line 149 as timing reference signal $T_{REF}$. The first timing discriminator 140 outputs a timing difference $\Delta T_1$ upon line 154. The timing difference $\Delta T_1$ corresponds to the difference between the timing of the signals received upon lines 148 and 149. The second. timing discriminator 141 outputs a second timing difference $\Delta T_2$ upon line 154. The second timing difference $\Delta T_2$ corresponds to the difference between the timing of the signals received upon lines 149 and 150. The timing difference signals $\Delta T_1$ and $\Delta T_2$ are supplied upon lines 154 and 155 to the differential range module 158 which calculates a timing differential $\Delta T_1 - \Delta T_2$. The timing differential $\Delta T_1 - \Delta T_2$ is multiplied by the speed of light c and converted to a range differential $\Delta R$ which corresponds to the difference in range (i.e., $R_1 - R_2$) between the user terminal 104 and the first and second satellites 102 and 108.

The first frequency discriminator 142 receives the first communications signal ES1 detected by the receiver from satellite 102 and earth station 100 along line 151. The first frequency discriminator 142 also receives a frequency reference signal $F_{REF}$ upon line 152. The first frequency discriminator 142 outputs a frequency difference $\Delta F_1$ upon line 156 which represents the difference between the detected carrier frequency of the first communications signal ES1 and the reference frequency $F_{REF}$. The second frequency discriminator 143 receives the second communications signal ES2 upon line 153. The second communications signal ES2, as detected by the second receiver, is relayed by the satellite 108 from the earth station 106 to the mobile terminal 104. The second frequency discriminator 143 outputs a frequency difference $\Delta F_2$ upon line 157 which corresponds to a difference between the detected carrier frequency of the second communications signal ES2 and the reference frequency $F_{REF}$. The frequency differences $\Delta F_1$ and $\Delta F_2$ are supplied to the differential range rate module 160 which calculates a differential range rate $\Delta R'$ equaling the frequency difference $\Delta F_1 - \Delta F_2$ divided by a nominal frequency $F_{NOM}$ times the speed of light c. The differential range rate $\Delta R'$ is output upon line 163.

The nominal frequency $F_{NOM}$ corresponds to the known carrier frequency utilized by the first satellite 102 for the forward downlink 116. The differential range $\Delta R$ and range rate $\Delta R'$ upon lines 162 and 163 are transmitted by the user terminal 104 as message signals within in-band signaling via return uplink 118 and return downlink 120 through satellite 102 to the earth station 100.

The differential calculation subsection 138 periodically monitors the timing and frequency differentials between the incoming communications signals received upon forward downlinks 116 and 124 and returns corresponding differential range and range rate information to the earth station 100.

Optionally, the first and second communications signals received upon forward downlinks 116 and 124 may be configured into data packets that include a broadcast synchronization field. The discriminators 140–143 may utilize the information within the synchronization field of incoming packets of the first and second communications signals ES1 and ES2 to calculate the timing and frequency differences $\Delta T_1$, $\Delta T_2$, $\Delta F_1$ and $\Delta F_2$.

Figure 7:
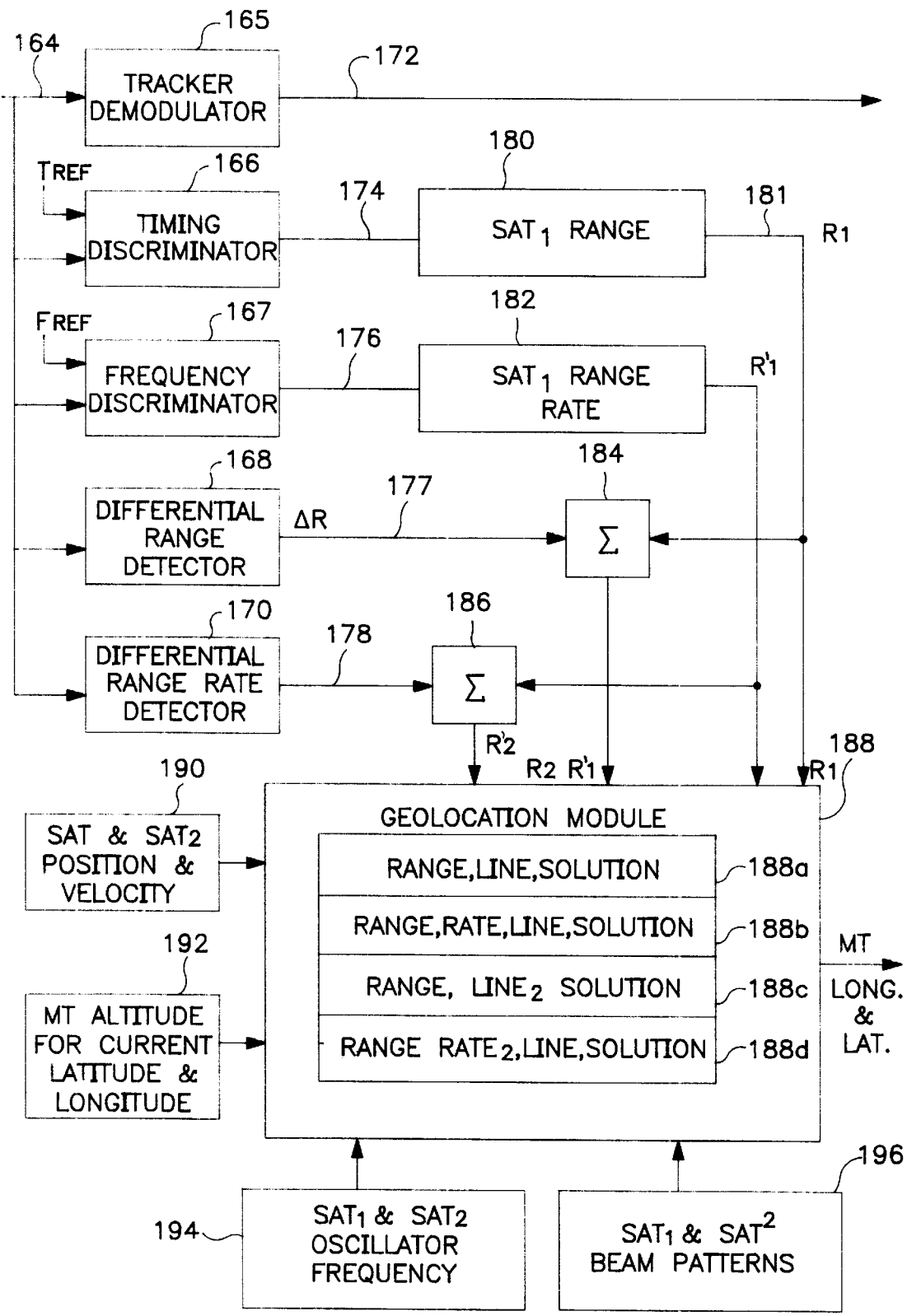
FIG. 7 illustrates a block diagram of a subsection of an earth station which calculates geolocation information according to an alternative embodiment of the present invention.

Turning to FIG. 7, a block diagram is illustrated of a subsection of the earth station utilized in connection with the alternative embodiment of the present invention. The subsection illustrated in FIG. 7 operates in a manner similar to the subsection illustrated in FIG. 3, and thus the modules common to FIGS. 3 and 7 are not explained hereafter in detail.

A return communications signal is received by the earth station 100 at line 164 from the return downlink 120 (FIG. 5). The communications signal is passed through a tracker demodulator 165 and output as a communications data stream upon line 172. The communications signal is also supplied to timing and frequency discriminators 166 and 167 which compare same with timing and frequency reference signals. Based upon the comparisons within discriminators 166 and 167, timing and frequency error offsets are output upon lines 174 and 176 to SAT1 range calculation module 180 and SAT2 range rate calculation module 182. The SAT1 range module 180 calculates the range $R_1$ between the first satellite 102 and user terminal 104 in a manner similar to that of the first embodiment (see FIG. 4, steps 210–214). The SAT1 range rate calculation module 182 calculates the range rate $R_1'$ (relative velocity) between the first satellite 102 and user terminal 104 in a manner similar to that utilized in connection with the first embodiment (FIG. 4, steps 218–222). It is to be understood that the description within the first embodiment of the "Doppler shift" relates to the use of the "range rates" in connection with the alternative embodiment of FIG. 5. Range rate corresponds to relative velocity, from which a Doppler shift may be calculated in a known manner.

The incoming communications signal received upon line 164 is also applied to differential range and range rate detectors 168 and 170. The differential range detector 168 obtains the range differential ΔR returned by the mobile terminal 104 within the in-band signaling channel. The differential range rate detector 170 obtains the range rate differential ΔR' output from the mobile terminal 104 within the in-band signaling channel. The range differential ΔR is summed at summer 184 with the range $R_1$ for the first satellite 102. The differential range rate ΔR' is combined in summer 186 with the range rate $R_1$' corresponding to the first satellite 102. Summer 184 outputs a second range $R_2$ corresponding to the sum of the differential range ΔR and the first range $R_1$. Summer 186 outputs a second range rate $R_2$' which corresponds to the sum of differential range rate ΔR' and first range rate $R_1$'.

The geolocation module 188 receives a plurality of inputs in order to calculate the geolocation (e.g., longitude and latitude) of the mobile terminal 104. The geolocation module 188 receives first and second ranges $R_1$ and $R_2$ corresponding to the distances of the first and second satellites 102 and 108 from the mobile terminal 104 (FIG. 5). The geolocation module 188 further receives the first and second range rates $R_1$' and $R_{21}$'. The first range rate $R_1$' corresponds to the relative velocity at which the first satellite 102 moves relative to the mobile terminal 104. The second range rate $R_1$' corresponds to the relative velocity at which the second satellite 108 moves with respect to the mobile terminal 104. As explained below, when the mobile terminal 104 is in motion, the range rates $R_1$' and $R_2$' do not correspond to the actual velocity of the first and second satellites 102 and 108. Instead, when the mobile terminal 104 is in motion, the range rates $R_1$' and $R_2$' correspond to the relative motion between the mobile terminal 104 and satellites 102 and 108.

The geolocation module 188 includes calculation modules 188a–188d for calculating range line solutions and range rate line solution (e.g., Doppler line solutions) based on the ranges and range rates $R_1$, $R_2$, $R_1$' and $R_2$'. Specifically, the range calculation module 188a may calculate, based on the first range $R_1$, the first range line solution (line 126 in FIG. 5). The range calculation module 188b may calculate, based on the first range rate $R_1$', the first range rate line solution (line 128 in FIG. 5). The range calculation module 188c may calculate, based on the second range $R_2$, the second range line solution (line 130 in FIG. 5). The range calculation module 188d may calculate, based on the second range rate $R_2$', the second range rate line solution (line 132 in FIG. 5). The geolocation module 188 may utilize any two or more of the calculation modules 188a–188d to calculate two or more solution lines (126, 128, 130 and 132) and obtain points of intersection therebetween which correspond to potential geolocations of the mobile terminal 104. When two range calculation modules are utilized that have two points of intersection therebetween, additional information may be used by the geolocation module 188 to improve the accuracy of the location determination.

For instance, the geolocation module 188 may receive position and velocity information for the first and second satellites (module 190), mobile terminal altitude based on current latitude and longitude (module 192), oscillator frequency for the first and second satellites (module 194) and beam patterns for the first and second satellites (module 196). The geolocation module 188 may utilize information from one or more of modules 190, 192, 194 and 196 to reduce inaccuracies within the geolocation calculated by range calculation modules 188a–188d.

Optionally, the geolocation module 188 may calculate user terminal location based on three of the range and range rate values $R_1$, $R_2$, $R_1$' and $R_2$'. The fourth range or range rate value may also be utilized to further reduce error within the geolocation.

As a further option, the geolocation module 188 may calculate the location of the user terminal 104 based on the first and second range values $R_1$ and $R_2$, and not based upon the first and second range rates $R_1$' and $R_2$', since the range values $R_1$ and $R_2$ are insensitive to user motion. When range rates $R_1$' and $R_2$' are utilized and the user terminal 104 is in motion, an additional error is introduced into the calculation. This additional error results from the fact that the range rates $R_1$' and $R_2$' are generated based on frequency differentials between detected frequencies (at the earth station and at the user terminal) and reference frequencies. The system presumes that the frequency differential arises from motion of the satellite. However, when the user terminal is in motion, the frequency differentials between detected and reference frequencies are due in part to satellite motion and in part to motion of the user terminal. However, when range rate solution lines are calculated, they are based on the assumption that the first and second range rates $R_1$' and $R_2$' result solely from satellite movement. Thus, range solution lines include an inherent error unless motion of the user terminal 104 is compensated.

The range values $R_1$ and $R_2$ do not vary with user motion and thus do not introduce similar error into the first and second range lines 126 and 130 even when the user terminal 104 is in motion. When location is determined based on the first and second range line solutions 126 and 130, two points of intersection will exist. One of these two points may be chosen by the geolocation module 188 based on additional information provided thereto by modules 190–196. For instance, one of the two points of intersection between the first and second range lines 126 and 130 may be within a beam spot covering the user terminal 104 while the other point of intersection is not within a beam spot covering the user terminal 104. Consequently, the beam pattern information provided by module 196 may be utilized by the geolocation module 188 to discriminate between the two points of intersection.

As yet a further alternative embodiment, the geolocation module 188 may utilize one or both of the range rates $R_1$' and $R_2$' in combination with position and velocity information provided by the module 190 to correct for user terminal motion.

Optionally, the geolocation module 188 may choose which of the range calculation modules 188a–188d to use based on knowledge of movement of the user terminal 104. For instance, if user terminal 104 is known to be at rest, the geolocation module 188 may utilize three or more of the range calculation modules 188a–188d. gHowever, if the geolocation module 188 determines that the user terminal 104 is in motion, and in particular, motion at a high velocity, the geolocation module 188 may simply use the range line calculation modules 188a and 188c, along with the beam pattern information from module 196.

Optionally, for user terminals in motion, once the geolocation module determines the geoposition (based on first and second range values $R_1$ and $R_2$ and the beam pattern information), the geolocation module 188 may further calculate the speed and direction of travel of the user terminal.

Optionally, as noted above, the first and second earth stations 100 and 106 operate in a timing and frequency synchronized manner with respect to one another or with known timing and frequency offsets with respect to one another. When the timing between the first and second earth stations 100 and 106 is synchronized, the internal timing clocks of the first and second earth stations 100 and 106 are synchronous with the system clock. Similarly, when the frequency between the first and second earth stations 100 and 106 is synchronized, the oscillators of the frequency generators within the first and second earth stations 100 and 106 are synchronized with the system oscillator. Thus, the first and second earth stations 100 and 106 transmit communications signals to the user terminal 104 based on a synchronized reference time and frequency.

The actual instant in time at which the earth stations transmit communications signals is adjusted individually in each earth station to ensure that both communications signals are received at the same instant in time by the user terminal 104. Similarly, the carrier frequencies at which communications signals are transmitted from the first and second earth stations 100 and 106 are adjusted individually in each earth station to ensure that both communications signals are received over links 116 and 124 at the user terminal 104 at the same frequency.

While the explanation of the embodiment of FIG. 5 references synchronized timing and frequency between the first and second earth stations 100 and 106, as noted above, the present invention is not so limited and may be implemented with different timings and frequencies at the first and second earth stations. In this alternative embodiment, the earth station 100 may retain a record of the frequency and timing of the second earth station 106 and use a corresponding correction factor in modules 188a–188d to account for any timing and frequency offsets between the first and second earth stations 100 and 106.

In addition, the first earth station 100 may retain a record of a position of the first and second satellites 102 and 108 and the second earth station 106. The first earth station 100 similarly may retain a record of the frequency conversion performed by satellites 102 and 108. Satellites 102 and 108 convert the carrier frequency of the forward uplinks 114 and 122 from K-band frequencies to S-band frequencies within the down links 116 and 124. This conversion between carrier frequencies within the uplinks and downlinks is based on the frequency of the oscillator utilized in the converter within each of satellites 102 and 108. Earth station 100 may retain a record of the oscillator frequencies used within the satellites, thereby enabling the earth station 100 to track the frequency conversions performed by the satellites.

The alternative embodiment of FIGS. 5–7 overcomes one potential disadvantage which may be experienced in limited circumstances by the first embodiment of FIGS. 1–4. The system of the first embodiment calculates two potential locations which are located symmetrically across the projection of the satellite velocity vector on the surface of the earth. The system of the alterative embodiment provides additional measurements from the second satellite to resolve ambiguity between these two potential locations for the user terminal. In addition, the system of the first embodiment may experience a decrease in location accuracy when the user terminal is located at a point at which the range solution line and range rate or Doppler solution line become nearly parallel to one another. In this situation, the additional or alternative measurements conducted in the embodiment of FIGS. 5–7 substantially increase location accuracy. Further, in the system of FIGS. 1–4, unknown terminal motion may induce a Doppler component which is not readily distinguishable from relative satellite motion. This additional Doppler component may degrade location accuracy. The system of the alterative embodiment affords an additional range measurement which is insensitive to this potential Doppler component introduced by movement of the terminal. Hence, position determination within the alternative embodiment is unaffected by terminal motion.

Alternatively, the preferred embodiments may be modified to utilize a communications link based on FDMA or TDMA coding or a hybrid coding technique, such as the combination of FDMA, TDMA, and CDMA codes. The code may utilize one or more of these coding techniques, so long as each communications signal received at the earth station includes a unique signature, such as an orthogonal code.

In the preferred embodiments, the synchronization data may be obtained by comparing reference signals with sync signals stored in a sync field of each frame of the signal. Optionally, the sync signal may be superimposed upon the data in the data field.

The two unknowns in terminal location, longitude and latitude, may be determined from any two of the four curves derived from the two pairs of range and range rate measurements. The redundant measurements are useful to improve the accuracy and resolve ambiguity of the location estimates which can be obtained using only two curves.

In systems which use a return link which is synchronous to the forward link, such as systems orthogonal CDMA, the location determination procedure may be implemented with no modification to the communication satellites or signals. More specifically, the signals from which range and range rate measurements are made are the same signals used for communication in the forward and return links to the terminal. The coherent and time synchronous return signal which is used for range and range rate measurements is generated by the user terminal 104 in normal operations to maintain CDMA.

The capability of the user terminal 104 to differentiate timing and frequency between the first and second satellites 102 and 108 is used for normal operations to assure synchronization of the current return link signal with a future return link signal when communications are handed off between satellites.

In some system configurations, it may not be possible to make the two pairs of range and range rate measurements. The inventive concept can still be applied with less than four measurements, but there may be some degradation in accuracy and, for some satellite geometries, resolution of ambiguous pairs of potential terminal locations may be limited. For example, some systems may not require return link coherency, such as systems using TDMA or asynchronous CDMA. In these systems, only range measurements will be available, one from the first satellite 102 and one from the second satellite 108. These two range measurements are still sufficient to define two potential locations of the user terminal 104 on the surface of the earth.

Another example of where less than four measurements may be available is when the satellite constellation does not provide two satellites in view of all terminals 100% of the time. When less than complete double coverage exists range and range rate will occasionally be available from only a single satellite. Again, these two measurements define two potential locations on the surface of the earth. If the call is of sufficient duration, accuracy can be increased by repeating the single satellite measurement at a later time at which point the subsequent motion of the satellites will have changed the orientation of the range and range rate curves on the surface of the earth.

While particular elements, embodiments and applications of the present invention have been shown and described, it will be understood, of course, that the invention is not limited thereto since modifications may be made by those skilled in the art, particularly in light of the foregoing teachings. It is, therefore, contemplated by the appended claims to cover such modifications as incorporate those features which come within the spirit and scope of the invention.

We claim:

1. A method for determining a geolocation of a mobile terminal in a satellite based telecommunications system which supports first and second forward communications links from first and second earth stations through first and second satellites to a common mobile terminal and which supports at least one return communications link from the mobile terminal through the first satellite to the first earth station, said method comprising the steps of:

transmitting first and second communications signals over the first and second forward communications links to the mobile terminal from the first and second earth stations through the first and second satellites, respectively;

obtaining, at the mobile terminal, synchronization differential data based on the first and second communications signals received by the mobile terminal, said synchronization differential data corresponding to a difference in synchronization between the first and second communications signals received by the mobile terminal;

transmitting, from the mobile terminal, the synchronization differential data to the first earth station over the first return link;

determining, at the first earth station, return link synchronization data for the mobile terminal necessary to maintain incoming telecommunications signals received over the return link synchronized with the earth station;

calculating, at the first earth station, at least first and second geoposition lines, along which the mobile terminal is positioned, based on the return link synchronization data and the received synchronization differential data;

determining a geographic point of intersection of the at least first and second geoposition lines; and outputing the geographic point of intersection as a geolocation of the mobile terminal.

2. A method according to claim 1, wherein the obtaining step further comprises calculating, at the mobile terminal, a differential timing between timings of the first and second communications signals received by the mobile terminal.

3. A method according to claim 1, wherein the obtaining step further comprises calculating, at the mobile terminal, a differential frequency between frequencies of the first and second communications signals received by the mobile terminal.

4. A method according to claim 1, wherein the obtaining step further comprises:

generating a reference timing at the mobile terminal;

calculating a first timing difference between the reference timing and the timing of the first communications signal received from the first earth station; and calculating a second timing differential between the reference time and the timing of the second communications signal received from the second earth station; and calculating a differential timing between the first and second timing differences, said differential timing being included within the synchronization differential data relating to said differential timing.

5. A method according to claim 1, wherein the obtaining step further comprises the steps of:

generating a reference frequency;

calculating a first frequency difference between the reference frequency and a frequency of the first communications signal received from the first earth station;

calculating a second frequency difference between the reference frequency and the frequency of the second communications signal received from the second earth station; and calculating a differential frequency between the first and second frequency differences, the synchronization differential data transmitted from the mobile terminal to the first earth station relating to said differential frequency.

6. A method according to claim 1, wherein the step of determining a geographic poing of intersection includes the steps of:

obtaining from the synchronization differential data a differential range and differential range rate, the differential range corresponding to a difference in the ranges from the mobile terminal to the first and second satellites, the differential range rate, corresponding to a difference in range rates of the first and second satellites relative to the mobile terminal; and calculating at least first and second geoposition lines based on the return link synchronization data, the differential range and differential range rate.

7. A method according to claim 1, wherein said communications signal includes a CDMA code identifying the transmitting user terminal.

8. A method according to claim 1, wherein said communications signal includes an orthogonal code uniquely identifying the transmitting user terminal.

9. A method according to claim 1, wherein said step of determining return link synchronization data includes determining a timing offset between a reference timing and a received timing of the incoming communications signal, said return link synchronization data including said timing offset.

10. A method according to claim 1, wherein said step of determining return link synchronization data further comprises determining a frequency offset between a reference frequency and a received frequency of the incoming communications signal, said return link synchronization data including said frequency offset.

11. A method according to claim 1, wherein said step of calculating said first and second geoposition lines includes calculating a range solution line based on said return link synchronization data and synchronization differential data, said range solution line constituting said first geoposition line.

12. A method according to claim 1, wherein said step of calculating said first and second geoposition lines further comprises the step of calculating a Doppler solution line based on said return link synchronization data and synchronization differential data, said Doppler solution line constituting said second geoposition line.

13. A method according to claim 1, further comprising the step of utilizing a beam spot covering the mobile terminal to calculate said points of intersection.

14. A method according to claim 1, further comprising the step of utilizing a predefined geographic cell, to which the mobile terminal is assigned to calculate said points of intersection.

15. A method according to claim 1, wherein said step of determining return link synchronization data further comprises the step of performing auto correlation upon said incoming communications signal and a reference timing signal to obtain a timing offset therebetween, said calculating step utilizing said timing offset to calculate said first geoposition line.

* * * * *